United States Patent
Mohler et al.

(10) Patent No.: US 12,355,335 B2
(45) Date of Patent: Jul. 8, 2025

(54) ROTOR FOR AN ELECTRIC MOTOR

(71) Applicant: MAHLE International GmbH, Stuttgart (DE)

(72) Inventors: Mario Mohler, Rosengarten (DE); Christoph Steinmetz, Ludwigsburg (DE)

(73) Assignee: Mahle International GmbH (DE)

( * ) Notice: Subject to any disclaimer, the term of this patent is extended or adjusted under 35 U.S.C. 154(b) by 223 days.

(21) Appl. No.: 17/961,496

(22) Filed: Oct. 6, 2022

(65) Prior Publication Data

US 2023/0112512 A1    Apr. 13, 2023

(30) Foreign Application Priority Data

Oct. 7, 2021  (DE) .......................... 102021211340.0

(51) Int. Cl.
*H02K 9/19* (2006.01)
*H02K 7/00* (2006.01)

(52) U.S. Cl.
CPC ............... *H02K 9/19* (2013.01); *H02K 7/003* (2013.01)

(58) Field of Classification Search
CPC .................................. H02K 9/19; H02K 7/003
See application file for complete search history.

(56) References Cited

U.S. PATENT DOCUMENTS

| | | |
|---|---|---|
| 6,191,511 B1 | 2/2001 | Zysset |
| 2012/0205996 A1* | 8/2012 | Buttner ................ H02K 9/225 310/54 |
| 2020/0195073 A1 | 6/2020 | Sawata |
| 2020/0251963 A1* | 8/2020 | Woody ................ H02K 5/18 |
| 2023/0034673 A1* | 2/2023 | Walbaum ............... H02K 1/32 |

FOREIGN PATENT DOCUMENTS

| | | | |
|---|---|---|---|
| JP | 5915888 A | 1/1984 | |
| JP | 2011015578 A | 1/2011 | |
| JP | 4786702 B2 | 10/2011 | |
| WO | WO-2021136819 A1 * | 7/2021 | ............ H02K 1/32 |

OTHER PUBLICATIONS

English abstract for JP-2011015578.
German Search Report for DE-102021211340.0, dated Jan. 5, 2022.

* cited by examiner

*Primary Examiner* — Tulsidas C Patel
*Assistant Examiner* — Mohammed Ahmed Qureshi
(74) *Attorney, Agent, or Firm* — Fishman Stewart PLLC

(57) ABSTRACT

A rotor for an electric motor is disclosed. The rotor includes a rotor shaft with a hollow space arranged in the rotor shaft at least in regions. The hollow space is structured as a cooling channel and has an inner surface. The inner surface of the hollow space comprises structures for an enlargement of a surface area, and/or at least one structural element is provided in the hollow space directly or indirectly connected to the inner surface of the rotor shaft for at least one of the enlargement of the surface area and/or for the mixing of coolant.

12 Claims, 2 Drawing Sheets

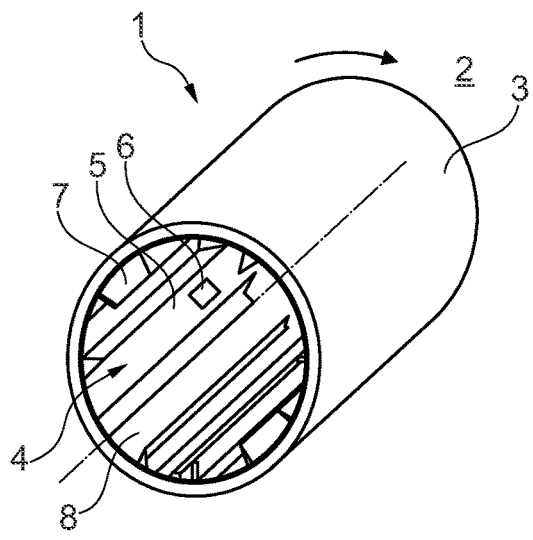
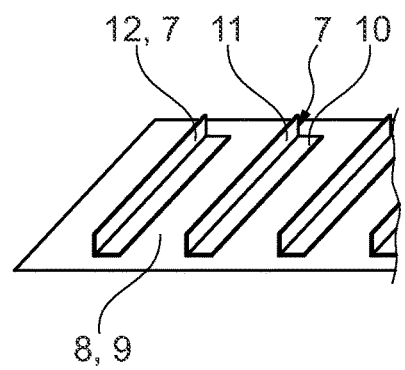
Fig. 1A          Fig. 1B
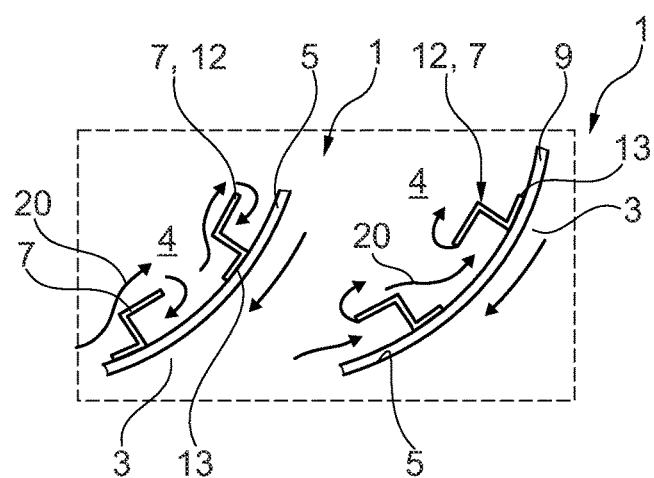
Fig. 2

ROTOR FOR AN ELECTRIC MOTOR

CROSS-REFERENCE TO RELATED APPLICATION

This application claims priority to German Application No. DE 10 2021 211 340.0 filed on Oct. 7, 2021, the contents of which are hereby incorporated by reference in its entirety.

TECHNICAL FIELD

The present invention relates to a rotor for an electric motor having a rotor shaft, in which a hollow space is arranged at least in regions. In addition, the invention relates to an electric motor having such a rotor.

BACKGROUND

Because of an increasing electrification, especially also in electric vehicles, powerful electric motors are also increasingly employed, which are characterised not only by a compact design but also by a high performance. However, a high performance density of necessity also leads to high thermal loads and requires corresponding cooling concepts, for example an active cooling of a rotor of an electric motor employed for driving an electric vehicle. For this purpose, a hollow space is provided in a rotor shaft of the rotor through which cooling fluid, for example gas or liquid coolant, is conducted, thereby cooling the rotor shaft and rotor windings arranged thereon.

The present invention therefore deals with the problem of stating an improved or at least an alternative embodiment for a rotor of the generic type, which is characterised in particular by an improved cooling option and thus a performance increase of an electric motor equipped with such a rotor, with a simple production at the same time.

According to the invention, this problem is solved through the subject of the independent claim(s). Advantageous embodiments are subject of the dependent claims.

SUMMARY

The present invention is based on the general idea of increasing a cooling effect of a rotor and thus indirectly also of an electric motor equipped with such a rotor in that a rotor shaft of the rotor is formed hollow not only at least in regions and this hollow space is utilised as cooling channel, but also in that an enlargement of the surface area of the hollow space is created, as a result of which a significantly enlarged heat transfer area is available, via which a significantly increased heat exchange between a coolant and the rotor shaft and thus an improved cooling of the rotor or of an electric motor equipped with such a rotor are possible. The rotor for an electric motor according to the invention, for example for an externally excited synchronous machine is equipped in the known manner with a rotor shaft, in which the previously mentioned hollow space is arranged at least in regions. According to the invention, this hollow space is designed as cooling channel, wherein an inner surface of the hollow space comprises structures for enlarging the surface area. In addition or alternatively, at least one structural element that is directly or indirectly connected to the inner surface of the rotor shaft for the enlargement of the surface area and/or for mixing a coolant flowing in the hollow space can be provided in the hollow space. Both embodiments, namely both the structures for the enlargement of the surface area and also the at least one structural element inserted into the hollow space make possible an enlargement of the heat-conducting surface area and thus an improvement of a cooling effect, wherein in addition the structures as well as the at least one structural element create surface irregularities which generate a swirling and thus a mixing of the coolant flowing in the hollow space and thus likewise an improved cooling effect. With the rotor according to the invention an improved cooling and thus a performance increase of an electric motor equipped with such a rotor is thus possible in a comparatively simple manner.

In an advantageous further development of the rotor according to the invention, the structures are introduced by means of laser. Such laser structures make possible a simple working of an inner surface of the hollow space and in addition to this a significant enlargement of the surface area that is available for the heat transfer, as a result of which such a laser structuring of the inner surface of the hollow space represents a solution that can be produced comparatively easily and significantly improved with respect to its cooling effect.

Practically, the at least one structural element is formed as a spring steel sheet. Such a spring steel sheet can be forced into the hollow space and be in contact with the inner surface of the hollow space, wherein such a spring sheet is not only connected to the inner surface of the hollow space and thus to the rotor shaft in a heat-conducting manner but because of its shape simultaneously promotes a swirling or mixing of the coolant flowing in the hollow space and thereby likewise improves the heat transfer. Alternatively to a spring steel sheet, other embodiments can obviously also be conceivable, such as for example simple sheets or plastic parts.

Practically, the spring steel sheet is formed so as to be self-stretching and directly or indirectly spring-preloaded against the inner surface of the hollow space. A spring steel place spring-preloaded in such a manner makes possible on the one hand a simple mounting by forcing the same into the hollow space of the rotor shaft and on the other hand a reliable fixing because of the spring preload, without for example further fixing means being required for this purpose. In addition, at least one locking element, for example a snap ring, can obviously be additionally provided, which additionally fixes the at least one structural element. Besides such a snap ring, other locking elements, such as for example pins, cotters or screws can obviously also be employed.

In a further advantageous embodiment of the rotor according to the invention, at least one structural element comprises a web shape, wherein a web projects from the inner surface of the hollow space towards the inside. By way of this, a heat-conducting connection of the structural element with the inner surface of the hollow space and thus with the rotor shaft is provided, as is also the possibility of a permanent mixing of the coolant flowing in the hollow space. Additionally or alternatively, a structural element can also be provided, which has a Z-shape, wherein in this case a Z-foot of the Z-shaped structural element lies against the inner surface of the hollow space. This, too, makes possible both an optimised heat transfer and also a permanent mixing of the coolant during the operation of the rotor.

In a further advantageous embodiment of the rotor according to the invention, the structural element comprises at least one punched-out guide element bent over towards the inside. Such guide elements bring about an additional swirling of the coolant flowing in the hollow space and thus an additionally improved heat transfer. In this case, the structural element can be formed for example as initially flat sheet strip, out of which in a following production step the at least one guide element is punched and bent over towards the inside. This makes possible not only a cost-effective but also a simple manufacture of the structural element in terms of production.

In a further possible embodiment of the rotor according to the invention, the structural element is formed as zigzag-shaped sheet ring and lies with outer tips against the inner surface of the hollow space. By way of this, cooling channels are formed which in the circumferential direction lie against the inner surface of the hollow space and which are arranged adjacent to one another at the same time and formed by the inner surface of the hollow space and the sheet ring. Alternatively it is also conceivable that the structural element is formed as a wave-shaped sheet ring with regular or irregular shape and on the outside lies against the inner surface of the hollow space. By way of this, a coolant conduction limited for example to a near region of the inner surface of the rotor shaft is possible, as a result of which altogether less coolant is needed and for example less coolant has to be stored or delivered for example, as a result of which a coolant reservoir and a delivery device, such as for example a pump, can be configured smaller. A smaller design of such coolant reservoirs or delivery devices simultaneously also means a weight saving which is of great advantage in particular in motor vehicles operated by electric motor.

Practically, at least one such cooling channel comprises an inlet on the longitudinal end side and at least one first outlet on the longitudinal end side located opposite. By way of this, a linear flow through the cooling channels along the inner surface is possible. Additionally or alternatively, a second outlet can also be provided between the inlet on the longitudinal end side and the first outlet on the longitudinal end side, via which coolant can flow out of the respective cooling channel into the hollow space towards the inside. Because of this, a larger quantity of coolant for cooling the rotor shaft and thus for cooling the electric motor can be employed. By way of coolant flowing within the sheet ring an internal cooling of the sheet ring is also possible, as a result of which the cooling effect can be increased again.

Further, the present invention is based on the general idea of equipping an electric motor with a rotor described in the preceding paragraphs and thereby transfer to the electric motor the advantages with respect to improved cooling and increased efficiency described previously with respect to the rotor.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description.

BRIEF DESCRIPTION OF THE DRAWINGS

There it shows, in each case schematically:

FIG. 1A a view of a rotor according to the invention having structural elements arranged in a hollow space of a hollow rotor shaft, FIG. 1B the structural elements on a sheet strip still flat prior to the installation, FIG. 2 structural elements formed Z-shaped in a front view, FIG. 3 structural elements which are produced by punching and bending-over, FIG. 4 a representation as in FIG. 3 however with fewer bent-over structural elements or guide elements, FIG. 5 a possible embodiment of a structural element as zigzag-shaped sheet ring in a frontal view, FIG. 6 a lateral view of FIG. 5 with inlets as well as first and second outlets.

DETAILED DESCRIPTION

Figure 3:
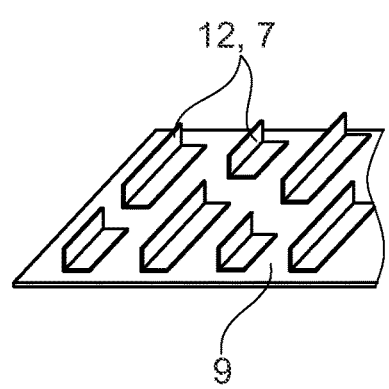

According to FIG. 1A, a rotor 1 according to the invention of an electric motor 2 which is not otherwise shown comprises a rotor shaft 3 in which a hollow space 4 is provided at least in regions. Here, the hollow space 4 is formed as a cooling channel so that through this hollow space 4 coolant 20, for example gaseous or liquid coolant 20 can flow during the operation of the electric motor 2 thereby cooling the rotor 1. By way of such a rotor cooling, the efficiency and also a performance density of the electric motor 2 can be significantly increased.

In order to be able to again increase the cooling performance, an inner surface 5 of the hollow space 4 can comprise structures for the enlargement of the surface area. Such structures 6 can be produced for example by mechanical processing, for example by grinding, turning, machining or similar or alternatively also by means of a laser, as a result of which laser structures with small recesses are created. Such a structure 6 produced by means of laser makes possible a significant enlargement of the surface area that is available for the heat transfer and thus increases the possible cooling performance. Additionally or alternatively, at least one structural element 7 connected to the inner surface 5 of the hollow space 4 or of the rotor shaft 3 can be provided in the hollow space 4 for enlarging the surface area that is available for the heat transfer and/or an improved mixing of the coolant 20 flowing in the hollow space 4. A connection between the structural element 7 and the inner surface 5 of the hollow space 4 can be effected either directly or indirectly for example by way of a sleeve 8 which is rolled up out of a sheet metal strip 9 (see FIG. 1B). In this case, the individual structural elements 7 are initially applied to the sheet metal strip 9 which is subsequently rolled up and slid into the hollow space 4 of the rotor shaft 3. An outer diameter of the rolled-up sheet metal strip 9 is preferentially adjusted larger than an inner diameter of the hollow space 4, as a result of which an automatic spring preload both of the sheet metal strip 9 and also of the structural elements 7 arranged therein against the inner surface 5 of the hollow space 4 and thus a reliable fixing can be achieved.

The at one structural element 7 can be formed for example as a spring steel sheet, so that in this case the sheet metal strip 9 is such a spring steel sheet. The structural elements 7 can for example have a web shape (see FIG. 1B), wherein the sheet metal strip 9 is punched by means of a U-shaped punching tool and a web 11 is subsequently bent out. In doing so, an opening 10 remains in the sheet metal strip 9. The web 11 projects to the inside into the hollow space 4. Thus the web thus is a punched-out guide element 12 bent over towards the inside (see FIGS. 1B, 3 and 4). Alternatively, the structural element 7 can also be formed S-shaped or U-shaped or angled otherwise.

Looking at the structural elements 7 according to FIG. 2, these have a Z-shape, wherein a Z-foot 13 lies either directly (see left representation in FIG. 2) or indirectly by way of a sheet metal strip 9 against the inner surface 5 of the hollow space 4.

Generally, a bearing of the structural element 7 against the inner surface 5 of the hollow space 4 is to include both a direct bearing and also an indirect bearing for example by way of a sheet metal strip 9.

Figure 4:
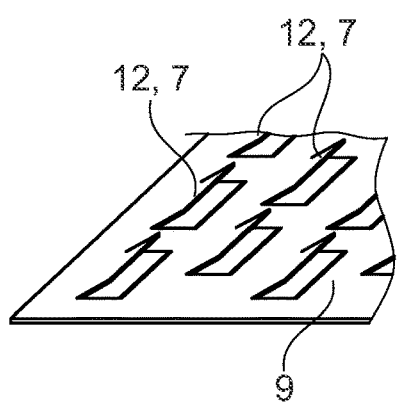

Looking at the structural elements 7 or the guide elements 12 according to FIGS. 3 and 4, these are bent out of the sheet metal strip 9 with different angles of incidence.

Figure 5:
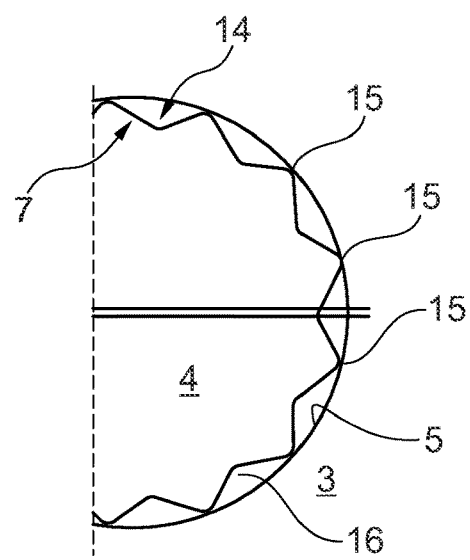
Figure 6:
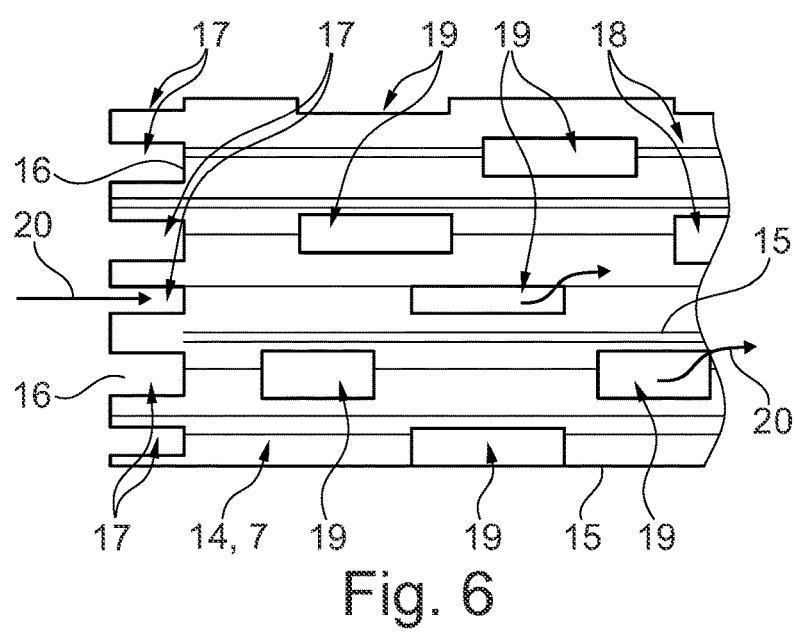

In FIGS. 5 and 6, a further embodiment is shown in which the structural element 7 is formed as a zigzag-shaped sheet ring 14, which with outer tips 15 lies against the inner surface 5 of the hollow space 4. It is also conceivable that a bearing region is larger or equal to the axial length of the tips 15. Alternatively it is also conceivable that the structural element 7 is formed as a wave-shaped sheet ring with regular or irregular shape and lies against the inner surface 5 of the hollow space 4 on the outside. Here, the sheet ring 14 together with the inner surface 5 of the hollow space 4 forms cooling channels 16 which in the circumferential direction lie between two outer tips 15 or wave peaks and are delimited towards the outside by the inner surface 5 of the hollow space 4 and towards the inside by the sheet ring 14.

The respective structural element 7 can also extend over the entire internal length of the hollow space 4 or be interrupted in the longitudinal direction, i.e. in the axial direction.

Looking at FIG. 6 it is noticeable that at least one cooling channel 16 comprises an inlet 17 on the longitudinal end sides and at least one first outlet 18 on the longitudinal end sides located opposite. In addition or alternatively, each cooling channel 16 can additionally comprise at least one second outlet 19 between the inlet 17 and the first outlet 18, as a result of which an exchange of the coolant with the interior of the hollow space 4 is also made possible.

The structural elements 7 or the sheet strips 9 carrying these are preferentially self-stretching, as a result of which a comparatively simple mounting and also a simple fixing in the hollow space 4 of the rotor shaft 3 is possible at the same time. Obviously, a locking element, for example a locking can be additionally provided which fixes the at least one structural element 7.

A transfer of the coolant 20 at the end of the respective structural elements 7 towards outlet openings at a respective end of the rotor shaft 3 can be additionally improved by suitable shapes, for example moulded-on diffusers or guide sheet-like structures. For this purpose, a structural body, for example utilising one of the solutions with respect to anti-rotation protection described above, can be positioned in a defined manner oriented towards the outlet openings in the rotor shaft 3. Besides a spring preload and thereby a self-fixing of the structural elements 7 in the rotor shaft 3, these can obviously also be fixed therein by way of other connecting means, such as for example a soldering, welding or bonding.

In the following, a possible manufacturing process of a structural element 7 in the manner of a punch-bent part is to be explained now.

Initially, a sheet metal strip 9 is punched and the individual guide elements 12 or structural elements 7 erected, wherein in this case the guide elements 12 or the structural elements 7 point to the inside later on. Following this, the sheet metal strip 9 is rolled up, wherein an outer diameter of the sheet metal strip 9 is selected larger than the inner diameter of the hollow space 4, into which the structural element 7 with the sheet metal strip 9 is introduced. Following this, the structural element 7 with the sheet metal strip 9 is introduced into the hollow space 4, wherein an inner diameter preferentially remains constant over the entire axial length. However, the same can also be embodied smaller on the introduction side, that is on a front side, than the remaining inner diameter of the hollow space 4, wherein the rolling-up of the sheet metal strip 9 is effected to a diameter that is smaller than the inner diameter of the rotor shaft 3 in order to generate a "joining clearance" between both geometries while introducing the sheet metal strip 9 into the rotor shaft 3.

Following this, the hollow space 4 is closed for example with a bearing, a cover or a shaft end incorporating a function-relevant output geometry for example by pressing-in or pressing-on or gluing, which can subsequently be additionally complemented by a welded connection, for example a laser welded connection.

With the structural element 7 according to the invention, which can also include the sheet metal strip 9, a rotor cooling can thus be significantly improved and thus a performance of an electric motor 2 equipped with such a rotor 1 significantly increased.

The invention claimed is:

1. A rotor for an electric motor, comprising:
   a rotor shaft with a hollow space arranged in the rotor shaft at least in regions,
   the hollow space is structured as a cooling channel and has an inner surface,
   wherein at least one of (i) the inner surface of the hollow space comprises structures for an enlargement of a surface area, and (ii) in the hollow space at least one structural element is provided directly or indirectly connected to the inner surface of the rotor shaft for at least one of the enlargement of the surface area and/or for the mixing of coolant, and
   wherein the at least one of (i) the structures for the enlargement of the surface area and (ii) the at least one structural element is structured and arranged around the inner surface to provide a mixing chamber in an interior region of the hollow space for mixing of coolant,
   wherein the at least one structural element is provided and comprises a spring steel sheet contacting the inner surface of the hollow space, the spring steel sheet including flow guide elements arranged spaced apart from one another and extending only partially inwards to promote a swirl of coolant in the hollow space.

2. The rotor according to claim 1, wherein the structures are lasered structures.

3. The rotor according to claim 1, wherein the spring steel sheet is structured so as to be self-stretching and is spring-preloaded against the inner surface of the hollow space.

4. The rotor according to claim 1, wherein the flow guide elements have a Z-shape, wherein a Z-foot of the Z-shape of the flow guide element directly or indirectly lies against the inner surface of the hollow space, and a free end of the Z-shape projects in a circumferential direction.

5. The rotor according to claim 1, wherein the flow guide element has a web shape protecting towards an inside.

6. A rotor for an electric motor, comprising:
   a rotor shaft with a hollow space arranged in the rotor shaft at least in regions,
   the hollow space is structured as a cooling channel and has an inner surface,
   wherein at least one of (i) the inner surface of the hollow space comprises structures for an enlargement of a surface area, and (ii) in the hollow space at least one structural element is provided directly or indirectly connected to the inner surface of the rotor shaft for at least one of the enlargement of the surface area and/or for the mixing of coolant, and wherein the at least one of (i) the structures for the enlargement of the surface area and (ii) the at least one structural element is structured and arranged around the inner surface to provide a mixing chamber in an interior region of the hollow space for mixing of coolant, wherein the at least one structural element is structured as a zigzag-shaped sheet ring and with outer tips lies against the inner surface of the hollow space and inner tips extending only partially inwards to promote a swirl of coolant in the hollow space.

7. The rotor according to claim 6, further comprising cooling channels that in a circumferential direction are arranged between two tips that are adjacent to one another and are delimited by the inner surface of the hollow space and the zigzag-shaped sheet ring.

8. The rotor according to claim 7, wherein at least one of the cooling channels comprises an inlet on a longitudinal inside and at least one of at least one first outlet on the longitudinal inside located opposite and a second outlet.

9. An electric motor, comprising:
a rotor, the rotor including:
a rotor shaft with a hollow space arranged in the rotor shaft at least in regions,
the hollow space is structured as a cooling channel and has an inner surface,
wherein at least one of (i) the inner surface of the hollow space comprises structures for an enlargement of a surface area, and (ii) at least one structural element is provided in the hollow space directly or indirectly connected to the inner surface of the rotor shaft for at least one of the enlargement of the surface area and/or for the mixing of coolant, and wherein the at least one of (i) the structures for the enlargement of the surface area and (ii) the at least one structural element is structured and arranged around the inner surface to provide a mixing chamber in an interior region of the hollow space for mixing of coolant, wherein the at least one structural element is provided and includes a spring steel sheet, the spring steel sheet contacts the inner surface of the hollow space, and wherein the spring steel sheet includes flow guide elements arranged spaced apart from one another and extending only partially inwards to promote a swirl of coolant in the hollow space.

10. The electric motor according to claim 9, wherein the spring steel sheet is spring-preloaded against the inner surface of the hollow space.

11. The electric motor according to claim 9, wherein the flow guide elements have a Z-shape with a Z-foot that lies directly or indirectly against the inner surface of the hollow space, and a free end of the Z-shape projects in a circumferential direction.

12. The electric motor according to claim 9, wherein the flow guide elements have a web shape projecting towards an inside.

* * * * *